2 Sheets—Sheet 1

G. S. SMITH.
Take-Up and Let-Off Mechanism for Looms.

No. 209,300. Patented Oct. 22, 1878.

Witnesses:

Inventor:
George S. Smith
Per C. H. Watson & Co. Attorneys.

2 Sheets—Sheet 2.
G. S. SMITH.
Take-Up and Let-Off Mechanism for Looms.
No. 209,300. Patented Oct. 22, 1878.
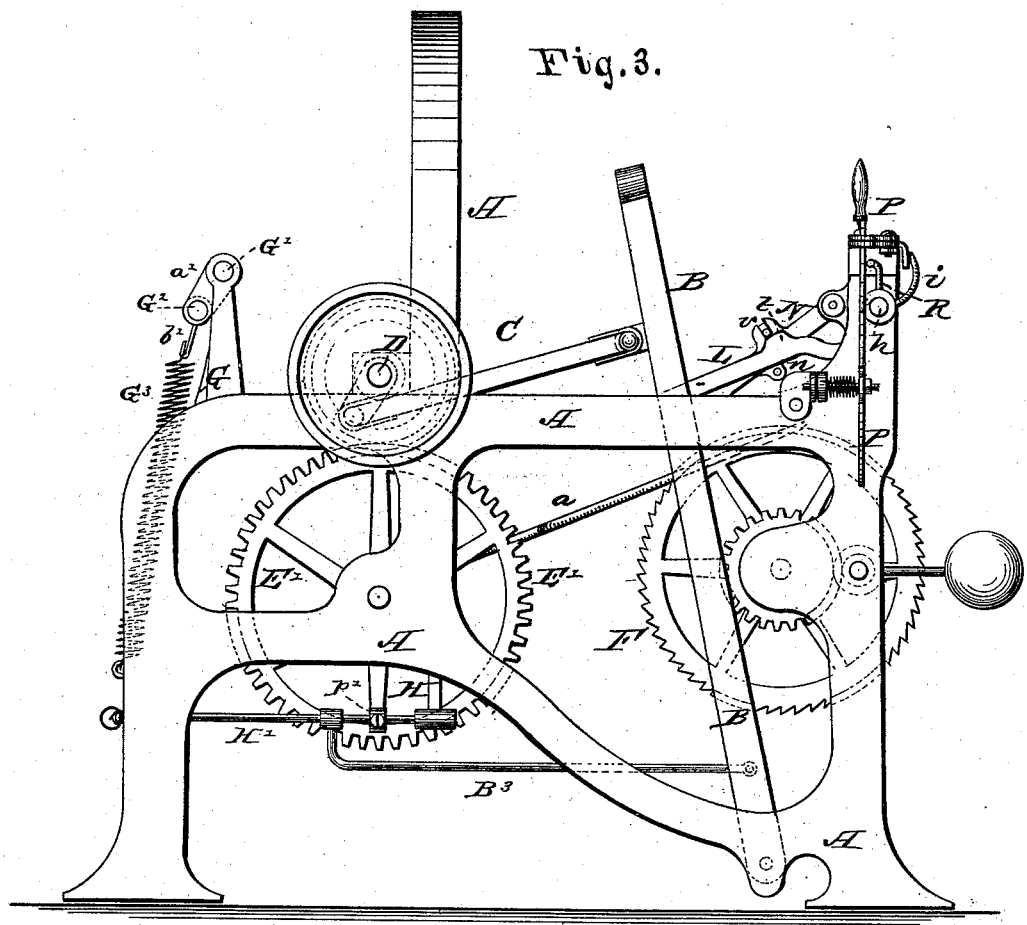
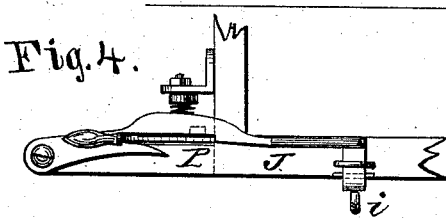
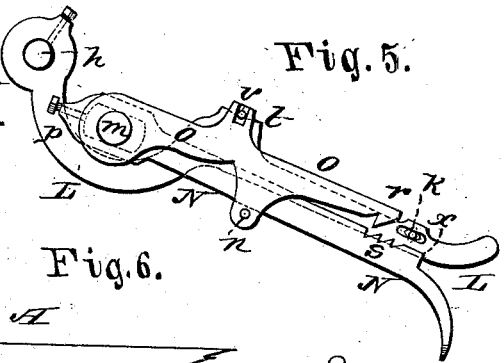
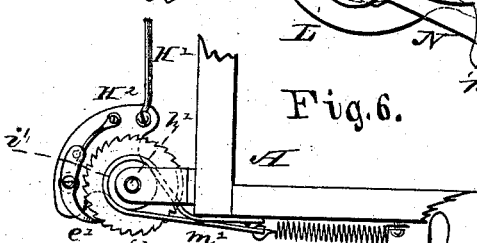
Witnesses:
P. C. Dietrich
Frank H. Duffy
Inventor:
George S. Smith.
Per C. H. Watson & Co. Attorneys.

UNITED STATES PATENT OFFICE.

GEORGE S. SMITH, OF MYSTIC BRIDGE, CONNECTICUT.

IMPROVEMENT IN TAKE-UP AND LET-OFF MECHANISMS FOR LOOMS.

Specification forming part of Letters Patent No. 209,300, dated October 22, 1878; application filed March 26, 1878.

*To all whom it may concern:*

Be it known that I, GEORGE S. SMITH, of Mystic Bridge, in the county of New London and State of Connecticut, have invented certain new and useful Improvements in Take-up and Let-off Mechanisms for Looms; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a take-up and let-off mechanism for looms, as will be hereinafter more fully set forth.

Figure 1:
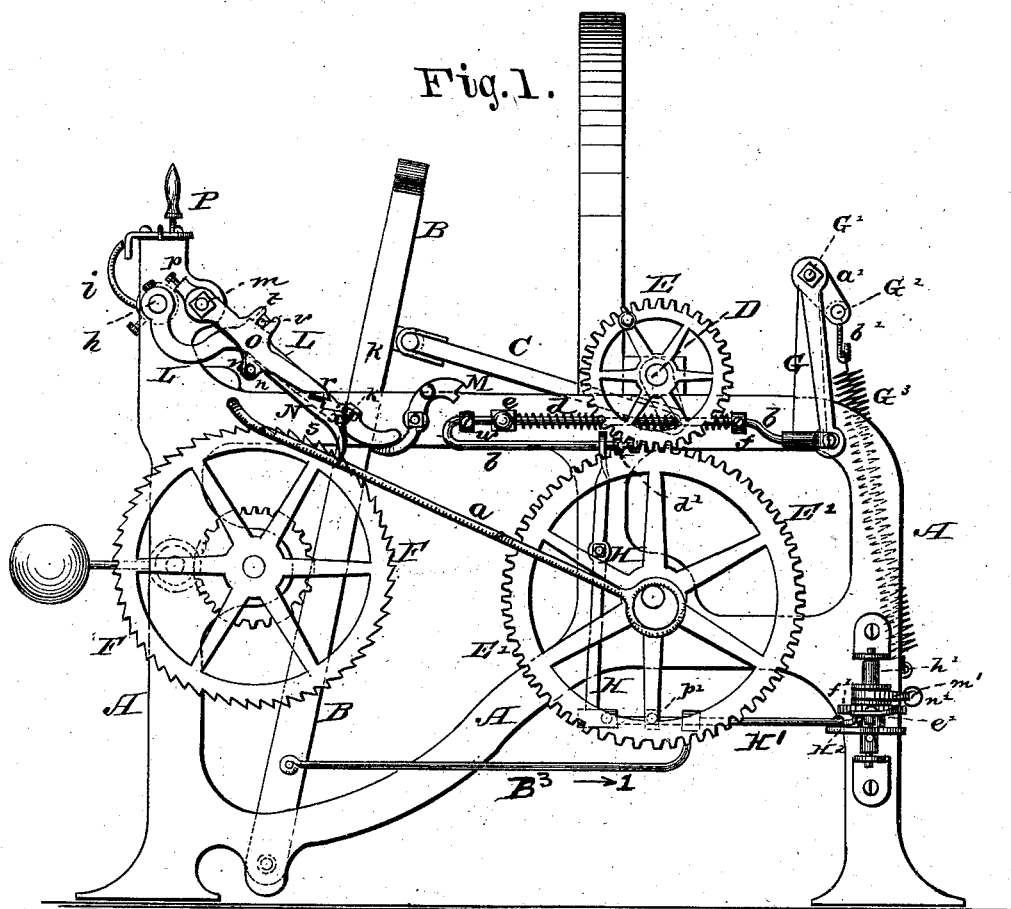
Figure 2:
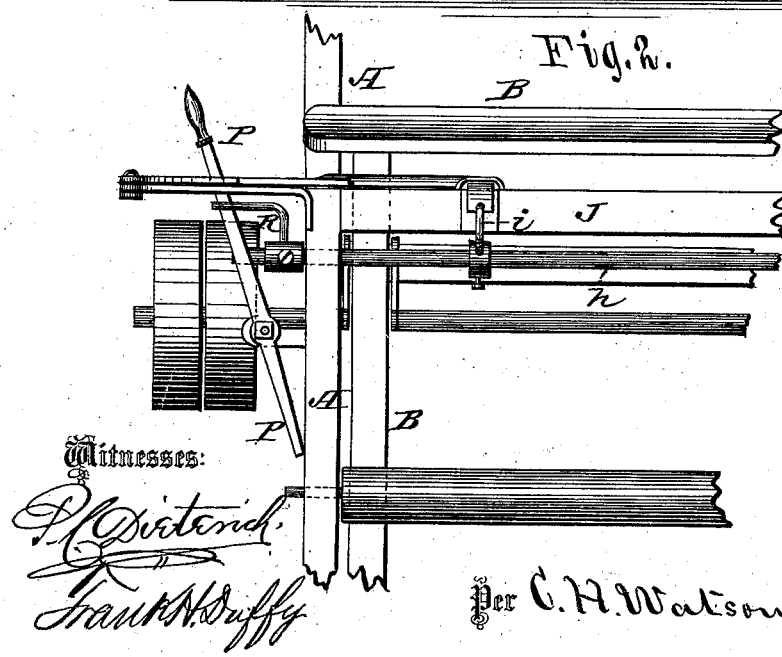

In the annexed drawings, Figure 1 is an end elevation of a loom embodying my invention. Fig. 2 is a front view of one end thereof. Fig. 3 is a view of the opposite end of the loom from that shown in Fig. 1. Figs. 4, 5, and 6 are detailed views of parts thereof.

A represents the frame of the loom. B is the lathe, operated by pitmen C C from the crank-shaft D. E is the driving-gear on the crank-shaft, meshing with the driving-gear $E^1$ on the cam-shaft of the loom. F is the take-up wheel, operated by a draw-pawl, $a$, or its equivalent, from the cam-shaft. G is a vibratory arm, connected at its free end with a rod, $b$, which moves in a guide, $e$, attached to the frame, and on said rod is a spiral spring, $d$, between the guide and a collar, $f$, on the rod.

The arm G is attached to one end of a shaft, $G^1$, and in short arms $a'$, connected to said shaft, is hung a counter-shaft, $G^2$.

The inner end of the rod $b$ is bent under and then backward, and has the upper end of a pivoted lever, H, placed loosely on said turned-under portion. On the end of this portion of the rod $b$ is an adjustable collar, $d'$, as shown.

The lower end of the lever H is, by a rod, $H^1$, connected with a swinging arm, $H^2$, which carries a pawl, $e'$, to operate on a ratchet-wheel, $f'$, secured on an upright shaft, $h'$. The upper end of this shaft $h'$ is to be connected by worm and other gearing with the warp-beam.

On the shaft $h'$, above the ratchet-wheel $f'$, or formed on the hub of said wheel, is a pulley, $i'$, around which is passed a strap, $m'$, one of the ends of this strap being attached to the framing, and the other connected to a spring, $n'$, to give necessary tension and prevent any backward movement of the let-off.

Near the lower end of the lathe B is pivoted a rod, $B^3$, the outer end of which forms an eye or socket, passing over the rod $H^1$, or the rod $H^1$ passing through said eye or socket. Between this eye and the lower end of the lever H, on the rod $H^1$, is an adjustable collar, $p'$.

It will readily be seen that as the lathe B moves inward, the rod $B^3$ slides upon the rod $H^1$ in the direction of arrow, permitting the strain of the warps to throw the lower end of the lever H in the same direction, which has the effect to turn the swinging arm $H^2$, so as to draw the pawl $e'$ a certain distance over the teeth of the ratchet-wheel $f'$. Now as the lathe moves outward again, the end of the rod $B^3$, coming in contact with the collar $p'$, will pull the rod $H^1$, so that the pawl $e'$ will rotate the ratchet-wheel $f'$, and through the mechanism connected therewith turn the warp-beam, so as to let off a certain portion of the warp. The movement of the rod $B^3$ turns the lever H on its pivot, so that the upper end thereof, acting against the collar $d^1$, will move the bent rod $b$, to permit the spring $d$ to expand, and also to turn the swinging arm G, so as to tighten the warps passing over the arm of the rock-shaft, the spring $d$ acting to maintain the tension. Then when the lathe again moves inward the strain exerted by the warps upon the rock-shaft causes the rod $H^1$ and its attachments to follow in the same direction as the rod $B^3$, so as to be ready for the next backward movement of said rod. By adjusting the collar $p'$ on the rod $H^1$, and the collar $d'$ on the rod $b$, the amount of movement of the warp-beam for each stroke is readily regulated.

It will readily be seen that if the bent rod $b$ were held stationary at a certain point, the devices connected with and operating the warp-beam would remain stationary, although the lathe might continue to move, because the rod $B^3$ would slide on the rod $H^1$ without coming in contact with the collar $p'$ thereon.

J represents the breast-beam, under which is placed a rod, $h$, provided with the finger $i$, and said finger is to be operated by the ordinary stock to which the filling-fork is attached when the filling runs out.

To one end of the rod $h$ is attached a lever, L, which is substantially of the form shown in Fig. 5, its inner or free end being curved upward and resting upon the curved end of a pivoted lock, M, to hold the other end of said lock elevated above a collar, $w$, on the curved end of the rod $b$.

In the lever L is a projecting pin, $k$, adjustable back and forth in a slot therein, for holding said lever in an elevated position by contact with the upper edge of the pawl N during a part of the operation, as hereinafter described.

N represents a bar or pawl, over which fits a shoe, O. This shoe is pivoted to the loom immediately in front of the rod $h$ by means of a stud, $m$, and this stud passes through a slot in the inner end of the pawl N, thus connecting said pawl also to the loom, while it admits of a certain limited longitudinal movement of the pawl. The pawl is held in the shoe by a pin, $n$, passing under the pawl through downwardly-projecting ears of the shoe, as shown.

At the inner end of the pawl N is an adjusting-screw, $p$, passing longitudinally into the slot through which the stud $m$ passes, for the purpose of regulating the longitudinal movement of the pawl.

The end of the shoe O is formed with a hook, $r$, taking into any one of a series of teeth, $s$, on the pawl N. On the top of the shoe is a lug, $t$, through which is passed a screw-pin, $v$, as shown, said pin projecting over the lever L.

When the finger $i$ of the rod $h$ has been operated as above stated, the rod $h$ turns in its bearings, causing the lever L to turn upward, and said lever, striking the pin $v$ in the shoe, raises the same; and by means of the pin $n$ the pawl N is lifted from the take-up wheel F, the end of the lever L at the same time releasing the lock M, which instantly drops upon the collar or bunter $w$, adjustably secured on the rod $b$, and thereby holds said rod, so that it cannot be moved by the action of the warps, and thus preventing any further paying out of the warp, as above stated.

When the filling has been renewed the handle P, connecting with the belt-shipper, relieves the arm R on that end of the rod $h$, thereby allowing the pawl N to drop into position. The pawl N, having a slight longitudinal movement, regulated by the set-screw $p$, will, when first dropped into position, hold the lever L, raised by its pin $k$, resting on the upper edge of the pawl.

The tension of the cloth causes a backward strain on the take-up wheel F, whereby the pawl N is drawn upward or backward until the pin $k$ in the lever L will drop over the shoulder $x$ on said pawl, and the end of the lever then striking the lock M relieves the same from the bunter $w$, thus allowing the warp to pay out and the work to proceed as before the stoppage. At the same time as the lever L drops down to relieve the lock M the hook $r$ in the shoe O engages with one of the teeth $s$ in the pawl and holds the same, so as not to move longitudinally.

With my invention, it will thus be seen, as soon as the lever L is raised the lock M is released and drops, instantly closing the let-off and holding it firm, whereby the operator is enabled to move the lathe back and forth, as he may require, for the purpose of mending in ends, &c., without paying out any of the warp, which would, if permitted, cause thin streaks in the cloth.

The adjustable pin $v$, adjustable screw $p$, and adjustable pin $k$ admit of the exact adjustment of the parts.

Having thus fully described my invention, what I claim as new, and desire to secure by Letters Patent, is—

In a power-loom, the combination, with the weft-fork and its carrier and the lever P, of the rod $h$, provided with the arm R and the finger $i$, the lever L, lock M, bunter $w$, and the let-off mechanism, the take-up wheel F, pawl N, shoe O, and adjusting devices $v$, $p$, and $k$, all substantially as and for the purposes herein set forth.

In testimony that I claim the foregoing as my own I have hereto affixed my signature in presence of two witnesses.

GEORGE S. SMITH.

Witnesses:
AMOS MALLORY,
S. E. GRISWOLD.